United States Patent
Inoue et al.

(10) Patent No.: US 8,715,860 B2
(45) Date of Patent: May 6, 2014

(54) NON-AQUEOUS ELECTROLYTE BATTERY

(75) Inventors: Takao Inoue, Kobe (JP); Kazunori Donoue, Kobe (JP); Denis Yau Wai Yu, Kobe (JP); Masahisa Fujimoto, Osaka (JP); Shin Fujitani, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1228 days.

(21) Appl. No.: 10/568,420

(22) PCT Filed: Feb. 14, 2005

(86) PCT No.: PCT/JP2005/002154
§ 371 (c)(1),
(2), (4) Date: Jul. 17, 2008

(87) PCT Pub. No.: WO2005/086260
PCT Pub. Date: Sep. 15, 2005

(65) Prior Publication Data
US 2008/0286655 A1    Nov. 20, 2008

(30) Foreign Application Priority Data

Mar. 3, 2004  (JP) ................................. 2004-058375
Mar. 19, 2004  (JP) ................................. 2004-080749

(51) Int. Cl.
| | |
|---|---|
| H01M 4/13 | (2010.01) |
| H01M 4/131 | (2010.01) |
| H01M 4/525 | (2010.01) |
| H01M 4/64 | (2006.01) |
| H01M 4/66 | (2006.01) |
| H01M 4/70 | (2006.01) |

(52) U.S. Cl.
USPC ....... 429/231.95; 429/212; 429/233; 429/245

(58) Field of Classification Search
USPC ............. 429/231.95, 212, 233, 245; 1/231.95
See application file for complete search history.

(56) References Cited

U.S. PATENT DOCUMENTS 5,601,951 A * 2/1997 Johnson et al. ............... 429/346
5,631,100 A * 5/1997 Yoshino et al. ................. 429/62
5,789,114 A * 8/1998 Adachi et al. ................ 429/232

(Continued)

FOREIGN PATENT DOCUMENTS

CN    1382310    11/2002
EP    1193783 A2    4/2002

(Continued)

OTHER PUBLICATIONS

Timcal, Super P Technical Data Sheet, Dec. 2008.*

(Continued)

*Primary Examiner* — Sean P Cullen
(74) *Attorney, Agent, or Firm* — Kratz, Quintos & Hanson, LLP

(57) ABSTRACT

A non-aqueous battery with improved volume energy density and enhanced load characteristics is made available even when using olivine-type lithium phosphate as a positive electrode active material.

The non-aqueous electrolyte battery of the present invention is provided with a positive electrode (1) containing lithium iron phosphate as a positive electrode active material, a negative electrode (2), and a non-aqueous electrolyte (4). In the positive electrode (1), a positive electrode active material-containing layer that is made of the positive electrode active material, a conductive agent, and a binder agent is formed on a positive electrode current collector. The positive electrode current collector has a thickness of less than 20 μm and its surface that is in contact with the positive electrode active material-containing layer has a mean surface roughness Ra of greater than 0.026.

12 Claims, 1 Drawing Sheet

(56) References Cited

U.S. PATENT DOCUMENTS

| | | | |
|---|---|---|---|
| 5,910,382 | A | 6/1999 | Goodenough et al. |
| 6,688,817 | B2 | 2/2004 | Borschert et al. ............. 408/230 |
| 6,716,556 | B2 | 4/2004 | Sunagawa et al. ......... 429/231.5 |
| 7,195,842 | B1 | 3/2007 | Fujimoto et al. .............. 429/209 |
| 2002/0028382 | A1 | 3/2002 | Sunagawa et al. ......... 429/231.5 |
| 2002/0106564 | A1* | 8/2002 | Okawa et al. ................. 429/221 |
| 2002/0124386 | A1* | 9/2002 | Hosoya et al. ............... 29/623.1 |
| 2004/0157127 | A1* | 8/2004 | Choi et al. ................. 429/231.8 |
| 2004/0234858 | A1* | 11/2004 | Torimae et al. .......... 429/231.95 |
| 2005/0233219 | A1* | 10/2005 | Gozdz et al. ............ 429/231.95 |

FOREIGN PATENT DOCUMENTS

| | | |
|---|---|---|
| EP | 1193783 A3 | 4/2002 |
| EP | 1267430 A1 | 12/2002 |
| JP | 5-6766 | 1/1993 |
| JP | 11-297307 | 10/1999 |
| JP | 2002-110162 | 4/2002 |
| JP | 2002-117833 | 4/2002 |
| JP | 2002-117907 | 4/2002 |
| JP | 2003-34534 | 2/2003 |
| JP | 2003-59493 | 2/2003 |
| JP | 2003-203628 | 7/2003 |

OTHER PUBLICATIONS

Endo, M., Machine translation of JP 05-006766 A, Jan. 1993.*
Supplementary European Search Report dated Jan. 28, 2010.
European Office Action dated Jul. 21, 2010.

* cited by examiner

NON-AQUEOUS ELECTROLYTE BATTERY

TECHNICAL FIELD

The present invention relates to a non-aqueous electrolyte battery comprising a positive electrode containing lithium iron phosphate as its positive electrode active material, a negative electrode, and a non-aqueous electrolyte. More particularly, the invention relates to improvements in a positive electrode current collector in which its adherence with the positive electrode active material has been enhanced.

BACKGROUND ART

Rapid advancements in size and weight reductions of mobile information terminals such as mobile telephones, notebook computers, and PDAs in recent years have created a demand for higher capacity batteries as driving power sources for such devices. With their high energy density and high capacity, non-aqueous electrolyte secondary batteries, such as represented by lithium-ion secondary batteries, are widely utilized as the driving power sources for such mobile information terminals as mentioned above.

A non-aqueous electrolyte secondary battery as mentioned above generally employs a positive electrode comprising a lithium-containing transition metal composite oxide such as lithium cobalt oxide ($LiCoO_2$), a negative electrode comprising metallic lithium, lithium alloy, or a carbon material such as graphite that is capable of intercalating and deintercalating lithium ions, and a non-aqueous electrolyte in which an electrolyte made of a lithium salt such as lithium fluoroborate ($LiBF_4$) or lithium hexafluorophosphate ($LiPF_6$) is dissolved in an organic solvent such as ethylene carbonate (EC) or diethyl carbonate (DEC). This kind of battery performs charge-discharge operations by transferring lithium ions between the positive and negative electrodes.

With the battery employing lithium cobalt oxide as its positive electrode material, the production cost tends to be high because of the use of cobalt, which is a rare resource the reserve of which is limited and is expensive. Moreover, the battery employing lithium cobalt oxide has an additional problem of low thermal stability because, when the battery in a charged condition is brought to a temperature that is unusually high, oxygen may be released from the positive electrode and the electrolyte may be burnt. For these reasons, use of lithium manganese oxide ($LiMn_2O_4$), lithium nickel oxide ($LiNiO_2$), or the like has been investigated as an alternative positive electrode material to lithium cobalt oxide. When lithium manganese oxide is used, however, a sufficient discharge capacity may not be obtained, and moreover, when the battery temperature becomes high, manganese dissolves in the electrolyte solution and deposits on the negative electrode, degrading cycle performance. On the other hand, the use of lithium nickel oxide has problems such as degradation in discharge voltage.

In view of these problems, olivine-type lithium phosphate such as lithium iron phosphate has in recent years drawn considerable attention as an alternative positive electrode material to lithium cobalt oxide. The olivine-type lithium phosphate is a lithium composite compound represented by the general formula $Li_xM_{1-(d+t+q+r)}D_dT_tQ_qR_r(XO_4)$ (wherein M includes at least one element among Fe, Mn, Co, Ti, and Ni; X includes at least one element among Si, S, P, and V; D is selected from bivalent ions and D=$Mg^{2+}$, $Ni^{2+}$, $Co^{2+}$, $Zn^{2+}$, or $Cu^{2+}$; T is selected from trivalent ions and T=$Al^{3+}$, $Ti^{3+}$, $Cr^{3+}$, $Fe^{3+}$, $Mn^{3+}$, $Ga^{3+}$, $Zn^{3+}$, or $V^{3+}$; Q is selected from tetravalent ions and Q=$Ti^{4+}$, $Ge^{4+}$, $Sn^{4+}$, or $V^{4+}$; R is selected from pentavalent ions and R=$V^{5+}$, $Nb^{5+}$, or $Ta^{5+}$; 0≤x≤1; and 0≤d, t, q, and r≤1), and it shows varied working voltages depending on the type of the metal element M, which serves as the core.

Accordingly, it has an advantage that battery voltage can be freely set by appropriately selecting the metal element M, which serves as the core. Another advantage is that since its theoretical capacity is relatively high, about 140 mAh/g to 170 mAh/g, battery capacity per unit mass can be made large. Furthermore, lithium iron phosphate ($LiFePO_4$), which contains iron as M in the general formula, has an advantage that the production cost of batteries can be significantly lowered because of the use of iron, which is produced abundantly and is low in cost.

Nevertheless, in order to use olivine-type lithium phosphate as a positive electrode active material for the non-aqueous electrolyte battery, there are still problems to overcome. Particularly serious issues are as follows. Specifically, the olivine-type lithium phosphate is slow in the lithium intercalation and deintercalation reaction during battery charge-discharge operations and is much lower in electronic conductivity than lithium cobalt oxide, lithium nickel oxide, lithium manganese oxide ($LiMn_2O_4$), and the like. For this reason, the battery employing an olivine-type lithium phosphate shows an increase in polarization particularly in high-rate discharging, considerably degrading battery performance.

In order to solve this problem, Patent Reference 1 proposes the use of a positive electrode active material in which the particle size of primary particle of $LiFePO_4$ is very small 3.1 μm or less and the specific surface area is sufficiently large.

It is thought that the use of the positive electrode active material proposed in Patent Reference 1 increases the contact area with the conductive agent and improves the electronic conductivity of the positive electrode active material, but the use of a positive electrode active material with a small particle size has a problem of lowering the filling density of the positive electrode active material, thus lowering the energy density of the battery as a whole. Another problem is that the olivine-type lithium phosphate shows a lower degree of adherence with the metal foil that serves as the positive electrode current collector, so it tends to easily peel off from the positive electrode current collector even if a binder agent is mixed therein. To date, Patent Reference 2 below proposes the technique of preventing the peeling-off of the positive electrode active material form the positive electrode current collector by providing a positive electrode current collector having a large surface roughness with a positive electrode mixture.

[Patent Reference 1] Japanese Published Unexamined Patent Application No. 2002-110162

[Patent Reference 2] Japanese Published Unexamined Patent Application No. 5-6766

DISCLOSURE OF THE INVENTION $LiCoO_2$, $LiNiO_2$, $Li_xNi_{1-y}Co_yO_2$, $LiMn_2O_4$, $LiNi_{1/3}Co_{1/3}Mn_{1/3}O_2$, and the like that are conventionally used as positive electrode active materials show good degrees of adherence and therefore make it possible to dispose a sufficient amount of positive electrode active material on a positive electrode current collector not only when using the positive electrode current collector having the surface roughness as described in Patent Reference 2 but also when using other positive electrode current collectors that do not have the surface roughness as described in Patent Reference 2. In contrast, the olivine-type lithium phosphate shows a low degree of adherence with a metal foil that serves as a positive electrode current collector and therefore has a problem that it can peel off from the positive electrode current collector even when a binder agent is mixed therein.

In such a case, it may be possible to use a technique of preventing the positive electrode active material form peeling off from the positive electrode current collector by reducing the thickness of the positive electrode active material-containing layer; however, reducing the thickness of the positive electrode active material-containing layer increases the proportion of the positive electrode current collector that occupies the total thickness of the positive electrode, lowering the volume energy density of the positive electrodes. Moreover, the olivine-type lithium phosphate has a higher electrical resistance than conventionally-used materials such as $LiCoO_2$, $LiNiO_2$, $Li_xNi_{1-y}Co_yO_2$, $LiMn_2O_4$, and $LiNi_{1/3}Co_{1/3}Mn_{1/3}O_2$, and therefore, when performing a charge-discharge operation at a large current, battery voltage lowers and sufficient charge-discharge capacity cannot be obtained.

In order to solve this problem, various techniques have been studied, such as coating carbon on the surface of the olivine-type lithium phosphate to enhance conductivity, but satisfactory results have not been attained. Unless sufficient pressure-rolling is carried out after applying the positive electrode mixture to prevent the positive electrode active material from peeling off from the positive electrode current collector, the volume energy density lowers, and moreover the contact areas between the positive electrode active material and the conductive agent and the positive electrode current collector lessens, degrading load characteristics additionally.

Accordingly, the present invention has been accomplished in view of such problems as described above, and it is an object of the invention to provide a non-aqueous electrolyte battery with which, when the positive electrode active material is made of an olivine-type lithium phosphate such as lithium iron phosphate, high capacity is achieved and the discharge performance during high-rate discharging can be enhanced dramatically by significantly improving the electronic conductivity in the positive electrode without reducing the energy density as a battery.

MEANS FOR SOLVING THE PROBLEMS

In order to accomplish the foregoing object, the invention as set forth in claim 1 provides a non-aqueous electrolyte battery comprising: a positive electrode, a negative electrode, and a non-aqueous electrolyte, the positive electrode having a positive electrode active material-containing layer formed on a positive electrode current collector and containing an olivine-type lithium phosphate as a positive electrode active material, characterized in that: the positive electrode current collector has a thickness of less than 20 μm, and a surface of the positive electrode current collector that is in contact with the positive electrode active material-containing layer has a mean surface roughness Ra of greater than 0.026 μm.

As described above, $LiCoO_2$, $LiNiO_2$, $Li_xNi_{1-y}Co_yO_2$, $LiMn_2O_4$, and $LiNi_{1/3}Co_{1/3}Mn_{1/3}O_2$, which have been used as positive electrode active materials, have higher electronic conductivity of the positive electrode active materials themselves than $LiFePO_4$, and the degrees of adherence between the positive electrode active material and the conductive agent, between the conductive agent and the positive electrode current collector, and between the positive electrode current collector and the positive electrode active material will not be of importance. Consequently, in the positive electrodes employing these positive electrode active materials ($LiCoO_2$, $LiNiO_2$, $Li_xNi_{1-y}Co_yO_2$, $LiMn_2O_4$, and $LiNi_{1/3}Co_{1/3}Mn_{1/3}O_2$), the charge-discharge characteristics do not vary greatly depending on the mean surface roughness Ra of the surface of the positive electrode current collector that is in contact with the positive electrode active material-containing layer (which hereinafter may be simply referred to as "mean surface roughness Ra of the positive electrode current collector").

On the other hand, olivine-type lithium phosphate shows low electronic conductivity of the positive electrode active material itself, and therefore, each of the adherence between the positive electrode active material and the conductive agent, the adherence between the conductive agent and the positive electrode current collector, and the adherence between the positive electrode current collector and the positive electrode active material will be of importance. Thus, it has been found that when employing the olivine-type lithium phosphate as a positive electrode active material, the greater the mean surface roughness Ra of the positive electrode current collector is, the better the charge-discharge characteristics, especially the better the charge-discharge characteristics at high rates; in particular, when the mean surface roughness Ra of the positive electrode current collector is greater than 0.026 μm, remarkably good charge-discharge characteristics are exhibited (particularly the discharge characteristics in high-rate discharging). The reason is believed to be that when the mean surface roughness Ra of the positive electrode current collector is greater than 0.026 μm, the contact area between the positive electrode current collector and the positive electrode active material-containing layer is large and the adherence between the positive electrode active material particles and the positive electrode current collector significantly improves, lowering the contact resistance.

In addition, when the adherence between the positive electrode active material particles and the positive electrode current collector significantly improves, the positive electrode active material-containing layer can be prevented from peeling off from the positive electrode current collector even when the positive electrode active material-containing layer is formed on the positive electrode current collector in such a manner that the thickness of the positive electrode active material-containing layer becomes great. As a consequence, the positive electrode current collector is allowed to keep retaining the positive electrode active material-containing layer, and thus, it becomes possible to apply the positive electrode active material in an amount for the capacity comparable to that with $LiCoO_2$, which has been conventionally used as a positive electrode active material, on to the same area of the positive electrode current collector.

Moreover, the improvement in the adherence between the positive electrode active material-containing layer and the positive electrode current collector serves to prevent the peeling-off of the positive electrode active material-containing layer from the positive electrode current collector that is caused by the pressure-rolling of the positive electrode. This makes it possible to perform sufficient pressure-rolling, improving the volume energy density. At the same time, the contact area between the positive electrode active material and the conductive agent increases, further improving the conductivity in the positive electrode as a whole, and the load characteristics also improve.

It should be noted that when the thickness of the positive electrode current collector increases, the volume of the positive electrode current collector within the positive electrode relatively increases and the volume energy density of the positive electrode lowers. For this reason, it is desirable that, as in the above-described construction, the thickness of the positive electrode current collector be restricted to less than 20 μm, and more preferably 15 μm or less.

The olivine-type lithium phosphate such as lithium iron phosphate (LiFePO$_4$) refers to a compound that has an olivine-type crystal structure and is represented by the general formula Li$_x$M$_{1-(d+t+q+r)}$D$_d$T$_t$Q$_q$R$_r$(XO$_4$) (wherein M includes at least one element among Fe, Mn, Co, Ti, and Ni; X includes at least one element among Si, S, P, and V; D is selected from bivalent ions and D=Mg$^{2+}$, Ni$^{2+}$, Co$^{2+}$, Zn$^{2+}$, or Cu$^{2+}$; T is selected from trivalent ions and T=Al$^{3+}$, Ti$^{3+}$, Cr$^{3+}$, Fe$^{3+}$, Mn$^{3+}$, Ga$^{3+}$, Zn$^{3+}$, or V$^{3+}$; Q is selected from tetravalent ions and Q=Ti$^{4+}$, Ge$^{4+}$, Sn$^{4+}$, or V$^{4+}$; R is selected from pentavalent ions and R=V$^{5+}$, Nb$^{5+}$, or Ta$^{5+}$; 0≤x≤1; and 0≤d, t, q, and r≤1).

Representative examples include LiFePO$_4$ and LiCoPO$_4$, but Li$_{0.90}$Ti$_{0.05}$Nb$_{0.05}$Fe$_{0.30}$CO$_{0.30}$Mn$_{0.30}$PO$_4$ also falls in under this category. Particularly, LiFePO$_4$ is advantageous in that iron compounds, which are the source materials, are easily available, but the same effect can be expected when using other transition metals such as Co, Ni, and Mn because they form particles having the same crystal structure.

Surface roughness Ra as used in the present application is defined in Japanese Industrial Standards (JIS B 0601-1994, see below) and can be measured by, for example, a surface roughness meter.

—Definition of Surface Roughness Ra

Surface Roughness Ra refers to a value obtained by the following Eq. 1, expressed in micrometers (μm), wherein, as shown in FIG. 1, a reference length L is taken from a roughness curve and the roughness curve is expressed as y=f(x), with the x-axis being along the mean line and the y-axis being along vertical magnification. In FIG. 1, m is a reference line.

$$Ra = \frac{1}{l} \int_o^l |f(x)| dx \quad [\text{Eq. 1}]$$

It should be noted that the positive electrode active material is not particularly limited to that made of an olivine-type lithium phosphate alone but may be a mixture of olivine-type lithium phosphate and other materials for positive electrode.

The invention as set forth in claim 2 is characterized in that, in the invention as set forth in claim 1, the olivine-type lithium phosphate is lithium iron phosphate.

When using lithium iron phosphate as the olivine-type lithium phosphate as in the above-described construction, the advantage is that the production cost of batteries can be lowered significantly because iron is produced abundantly and is low in cost.

The invention as set forth in claim 3 is characterized in that, in the invention as set forth in claim 1, the positive electrode current collector is an aluminum foil subjected to a roughened process and has a mean surface roughness Ra of less than 0.20 μm.

The invention as set forth in claim 4 is characterized in that, in the invention as set forth in claim 2, the positive electrode current collector is an aluminum foil subjected to a roughened process and has a mean surface roughness Ra of less than 0.20 μm.

As discussed above, in order to prevent the volume energy density of the positive electrode from lowering, it is necessary to reduce the thickness of the positive electrode current collector. On the other hand, if the thickness of the positive electrode current collector is reduced while the mean surface roughness Ra (μm) is increased, the problem arises that the strength of the positive electrode current collector lowers.

Herein, when using an aluminum foil as the positive electrode current collector, it is desirable that the tensile strength be 160 N/mm$^2$ or greater, and preferably 170 N/mm$^2$ or greater. It has been confirmed through experiments that, in order to attain the just-mentioned tensile strength using a positive electrode current collector in which the thickness of the aluminum foil is less than 20 μm, the mean surface roughness Ra of the positive electrode current collector be restricted to less than 0.20 μm.

In other words, when using an aluminum foil for the positive electrode current collector, it is desirable that the mean surface roughness Ra of the positive electrode current collector be 1/100 or less of the thickness of the positive electrode current collector. This, however, applies to the case that the positive electrode current collector is fabricated using polishing by blasting. If the process is carried out using other methods, such as etching, plating, and the like, it is possible to regulate the mean surface roughness Ra of the positive electrode current collector so as to be a little greater (for example, to 1/50 or less of the thickness of the positive electrode current collector). The reason why such a restriction is made is that a large mean surface roughness Ra of the positive electrode current collector can lower the strength of the positive electrode current collector because the impact caused to the positive electrode current collector is great when adopting polishing by blasting; on the other hand, when using etching, plating, or the like for the process, it is possible to prevent the decrease in the strength of the positive electrode current collector even if the mean surface roughness Ra of the positive electrode current collector is increased to a certain degree because the impact caused to the positive electrode current collector is small.

The invention as set forth in claim 5 is characterized in that, in the invention as set forth in claim 3, the roughening process is carried out by polishing by blasting.

The invention as set forth in claim 6 is characterized in that, in the invention as set forth in claim 4, the roughening process is carried out by polishing by blasting.

The reason why such a restriction is made is as follows. Although it is desirable to use etching, plating, or the like when a positive electrode current collector is subjected to a roughening process from the viewpoint of preventing the strength of the positive electrode current collector from degrading, these methods are complicated in terms of process and necessitate high manufacturing cost. In contrast, when using the polishing by blasting, its process is uncomplicated, so it is possible to reduce the manufacturing cost.

The invention as set forth in claim 7 is characterized in that, in the invention as set forth in claim 2, the lithium iron phosphate has an average particle size of 10 μm or less.

Restricting the average particle size of the positive electrode active material in this way makes it possible to control the distance of lithium diffusion associated with charging and discharging within the positive electrode active material particles, and has the effect of reducing the resistance associated with lithium intercalation and deintercalation and improving charge-discharge characteristics. That is, the use of lithium iron phosphate (LiFePO$_4$) with a controlled particle diameter is more effective in ensuring the contact area between the active material particles and the positive electrode current collector sufficiently by controlling the degree of roughness. It should be noted that it is desirable that both the median diameter (R$_{median}$) and the mode diameter (R$_{mode}$) of the particle size of the positive electrode active material as measured by a laser diffraction particle size analyzer be 10 μm or less, and more desirably 5 μm or less.

The invention as set forth in claim 8 is characterized in that, in the invention as set forth in claim 1, the positive electrode active material-containing layer contains a conductive agent, the conductive agent has a BET specific surface area of 15 m²/g or greater, and the positive electrode active material-containing layer has a filling density of 1.7 g/cm³ or greater.

The invention as set forth in claim 9 is characterized in that, in the invention as set forth in claim 2, the positive electrode active material-containing layer contains a conductive agent, the conductive agent has a BET specific surface area of 15 m²/g or greater, and the positive electrode active material-containing layer has a filling density of 1.7 g/cm³ or greater.

The invention as set forth in claim 10 is characterized in that, in the invention as set forth in claim 4, the positive electrode active material-containing layer contains a conductive agent, the conductive agent has a BET specific surface area of 15 m²/g or greater, and the positive electrode active material-containing layer has a filling density of 1.7 g/cm³ or greater.

If the conductive agent is restricted to have a BET specific surface area of 15 m²/g or greater and the electrode active material-containing layer is restricted to have a filling density of 1.7 g/cm³ or greater, the electronic conductivity can be improved considerably without lowering the energy density in the positive electrode even when the positive electrode active material contains an olivine-type lithium phosphate such as lithium iron phosphate; therefore, it is possible to enhance capacity and at the same time to dramatically improve discharge performance during high-rate discharging. The reason is believed to be as follows.

The diligent experiments conducted by the present inventors have found that when the conductive agent has a BET specific surface area of less than 15 m²/g, the contact area between the positive electrode active material and the conductive agent is small, and that when the positive electrode active material-containing layer has a filling density of less than 1.7 g/cm³, the energy density in the positive electrode lowers and moreover the adherence of the positive electrode active material with the conductive agent and with the positive electrode current collector becomes poor. From these facts, it was found that if the BET specific surface area of conductive agent is small or if the filling density in the positive electrode active material-containing layer is small, the energy density in the positive electrode lowers and the electronic conductivity within the positive electrode becomes insufficient; thus, increasing of the capacity is impossible, and moreover, the discharge performance during high-rate discharging degrades.

It has been recognized that, on the other hand, when the conductive agent is restricted to have a BET specific surface area of 15 m²/g or greater as in the above-described construction, the particle size of the conductive agent becomes small enough to disperse a sufficient amount of conductive agent over the surface of the positive electrode active material, making the contact area between the positive electrode active material and the conductive agent large, and when the filling density in the positive electrode active material-containing layer is restricted to be 1.7 g/cm³ or greater at the same time, the adherence of the positive electrode active material with the conductive agent and with the positive electrode current collector increases without degrading the energy density in the positive electrode. Thus, if the BET specific surface area of the conductive agent and the filling density in the positive electrode active material-containing layer is restricted as described above, good conductive paths are formed without lowering the energy density in the positive electrode, significantly improving the electronic conductivity within the positive electrode; therefore, battery capacity can be enhanced and at the same time discharge performance at high rate can be dramatically improved.

Although conductive carbon powder (first carbon particles) is preferably used as the conductive agent, conductive metal oxides or the like may also be used. If the amount of conductive agent added is too large, the proportion of the positive electrode active material mixed becomes small relatively, reducing the charge-discharge capacity of the positive electrode.

The invention as set forth in claim 11 is characterized in that, in the invention as set forth in claim 8, the positive electrode active material-containing layer has a filling density of 3.15 g/cm³ or less.

The invention as set forth in claim 12 is characterized in that, in the invention as set forth in claim 9, the positive electrode active material-containing layer has a filling density of 3.15 g/cm³ or less.

The reason why the filling density is restricted in this way is that, if the positive electrode active material-containing layer has a filling density of greater than 3.15 g/cm³, the space within the positive electrode becomes too narrow, so the amount of the electrolyte solution impregnated in the electrode becomes small, lowering the discharge capacity of the battery.

For the reason stated above, it is desirable that the filling density of the positive electrode active material-containing layer be restricted to be from 1.7 g/cm³ to 3.15 g/cm³, preferably from 1.7 g/cm³ to 2.7 g/cm³, and more preferably from 2.0 g/cm³ to 2.3 g/cm³.

The invention a set forth in claim 13 is characterized in that, in the invention as set forth in claim 1, carbon (second carbon particles) is superficially coated on, or adhered to, the positive electrode active material particles.

A problem with the olivine-type lithium phosphate such as lithium iron phosphate is its low electronic conductivity; specifically, the conductivity of lithium iron phosphate ($LiFePO_4$), which is one type of olivine-type lithium phosphate, is about $10^{-10}$ S/cm, while the conductivity of lithium cobalt oxide having a layered rock-salt structure is about $10^{-3}$ S/cm or greater. Thus, when carbon is superficially coated on, or adhered to, the positive electrode active material particles as with the above-described construction, the effect can be expected that the conductivity within the positive electrode can be further improved.

The invention as set forth in claim 14 is characterized in that, in the invention as set forth in claim 1, a portion of lithium sites in the positive electrode active material is substituted by a transition metal.

As with the above-described construction, the effect can be expected that the conductivity within the positive electrode is improved even when a portion of the lithium sites in the positive electrode active material is substituted by a transition metal.

In order to accomplish the foregoing object, the invention as set forth in claim 15 provides a non-aqueous electrolyte battery comprising: a positive electrode, a negative electrode, and a non-aqueous electrolyte, the positive electrode having a positive electrode active material-containing layer that is formed on a positive electrode current collector and contains an olivine-type lithium phosphate as a positive electrode active material, and the negative electrode containing a negative electrode active material capable of intercalating and deintercalating lithium, the battery characterized in that: the conductive agent has a BET specific surface area of 15 m²/g or greater; and the positive electrode active material-containing layer has a filling density of 1.7 g/cm³ or greater.

With the above-described construction, the same effects as those with claims 8 to 10 can be attained.

The invention as set forth in claim 16 is characterized in that, in the invention as set forth in claim 15, the olivine-type lithium phosphate is lithium iron phosphate.

With the above-described construction, the same effects as those with claim 2 can be attained.

The invention as set forth in claim 17 is characterized in that, in the invention as set forth in claim 15, the positive electrode active material-containing layer has a filling density of 3.15 g/cm³ or less.

The invention as set forth in claim 18 is characterized in that, in the invention as set forth in claim 16, the positive electrode active material-containing layer has a filling density of 3.15 g/cm³ or less.

With the above-described two constructions, the same advantageous effects as described with claims 11 and 12 can be attained.

ADVANTAGES OF THE INVENTION

According to the present invention, good conductive paths form in the positive electrode without lowering the energy density in the positive electrode and the electronic conductivity dramatically increases; therefore, an increased capacity in a battery is achieved and discharge performance at high rate is dramatically improved.

DESCRIPTION OF REFERENCE NUMERALS

Figure 1:
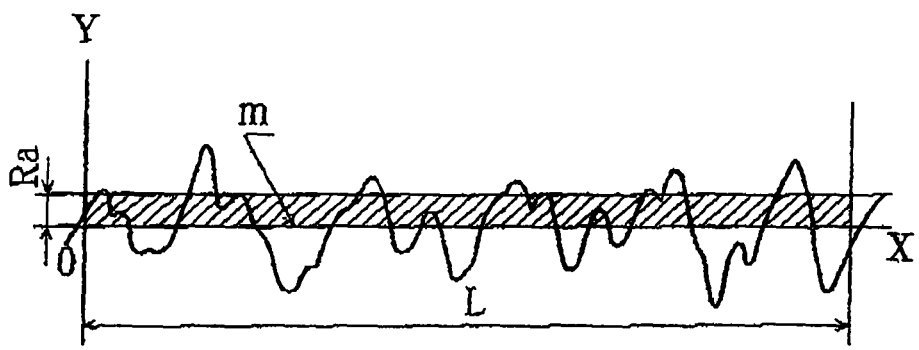
FIG. 1 is a view for illustrating surface roughness Ra.

1: positive electrode
2: negative electrode
4: non-aqueous electrolyte

BEST MODE FOR CARRYING OUT THE INVENTION

The best mode for carrying out the invention will now be described below. It should be noted, however, that the present invention is not limited to the following illustrative embodiments in any way but may be practiced with modifications and alterations within the scope of the invention.

Preparation of Positive Electrode

First, lithium iron phosphate (LiFePO₄) having an average particle size (both a median diameter ($R_{median}$) and a mode diameter ($R_{mode}$)) of 3 μm and acetylene black (Denka Black made by Denki Kagaku Kogyo) serving as a conductive agent were weighed to account for 85 mass % with respect to the total positive electrode active material-containing layer and 10 mass % with respect to the total positive electrode active material-containing layer, respectively, and were thereafter mixed together. Next, polyacrylonitrile (PAN) as a binding agent was added to the mixture so as to account for 5 mass % with respect to the total positive electrode active material-containing layer, and an appropriate amount of N-methylpyrrolidone (NMP) solution, serving as a solvent, was added further to the mixture and mixed therein, to prepare a slurry.

A positive electrode current collector was prepared that was formed of an aluminum foil with the surfaces roughed by a blasting process, in which the surface roughness Ra was 0.18 μm (Ra=0.18 μm), the maximum height $R_{max}$, which is specified by the later-described definition, was 2.2 μm ($R_{max}$=2.2 μm), and the thickness was 19.4 μm. Next, the prepared slurry was applied onto both sides of the positive electrode current collector by doctor blading. Thereafter, the resultant article was dried using a hot plate to volatilize NMP. After the drying, the resultant article was cut out into a size of 2 cm×2 cm, and press-rolled to a predetermined thickness (in this case the thickness of one side of the positive electrode active material-containing layer was 60 μm) using rollers so as to attain a predetermined active material filling density (in this case 2.2 g/mL), and further vacuum dried at 100° C. Thus, a positive electrode 1 was prepared.

—Definition of Maximum Height Ry

Figure 2:
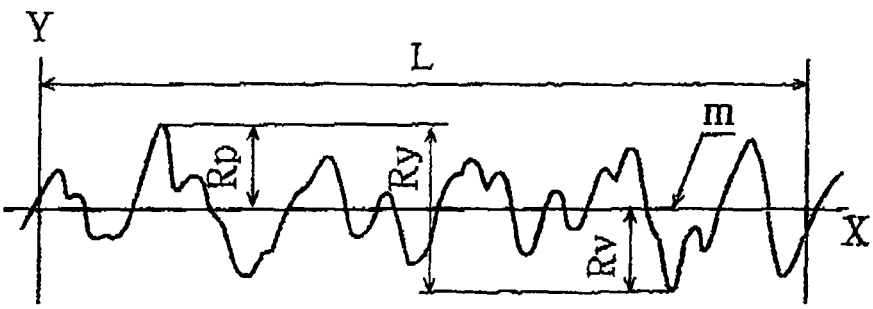
FIG. 2 is a view for illustrating maximum height $R_{max}$.

Maximum height Ry refers to the distance between the peak line and the valley line ($R_p+R_v$), expressed in micrometers (μm), that is measured along the vertical magnification of the roughness curve, wherein, as shown in FIG. 2, a reference length L is taken from a roughness curve along the mean line. In FIG. 2, m designates a reference line.

Preparation of Negative Electrode

A lithium metal plate was cut out into a size of 3 cm×2.5 cm, whereby a negative electrode 2 was prepared.

Preparation of Non-Aqueous Electrolyte

LiPF₆ as a lithium salt was dissolved at a concentration of 1.0 mole/L in an electrolyte in which ethylene carbonate (EC) and diethyl carbonate (DEC) were mixed at a volume ratio of 1:1, whereby a non-aqueous electrolyte was prepared.

Preparation of Test Cell

Figure 3:
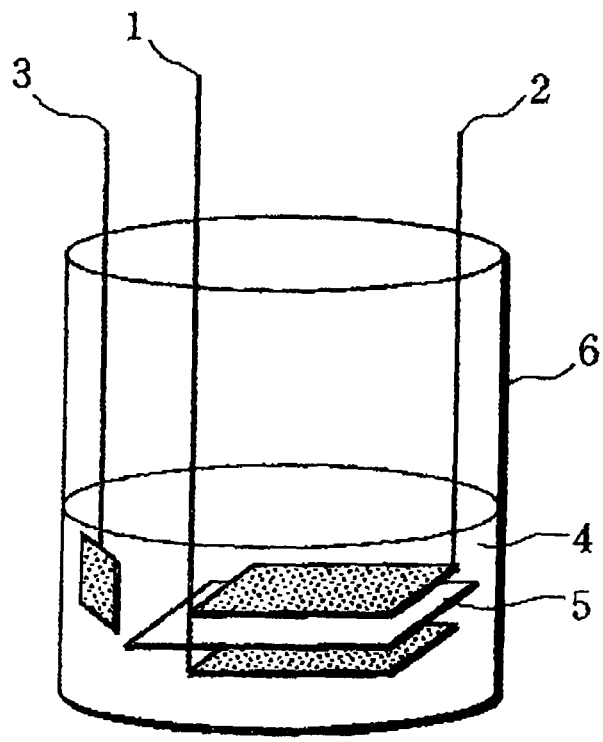
FIG. 3 is a view schematically showing a test cell employing a positive electrode according to the present invention.

Under an inert atmosphere, the above-noted positive electrode 1, serving as the working electrode, and the negative electrode 2, serving as the counter electrode, were disposed in a test cell container 6 with a separator 5 made of polyethylene (Hipore made by Asahi Kasei Corp.) interposed therebetween, and the above-noted non-aqueous electrolyte 4 was put into the test cell container 6, whereby a test cell was prepared as illustrated in FIG. 3. In FIG. 3, reference numeral 3 represents an reference electrode made of lithium metal.

EMBODIMENTS

First Embodiment

Example

A positive electrode and a test cell were prepared in the same manner as described in the foregoing Best Mode for Carrying out the Invention as Example. The positive electrode and the test cell thus prepared are hereinafter referred to as Positive Electrode a of the invention and Cell A of the invention, respectively.

Comparative Example 1

A positive electrode and a test cell were prepared in the same manner as in Example except that the positive electrode current collector used was formed of an aluminum foil that was not subjected to a blasting process for roughening and had a surface roughness Ra of 0.026 μm (Ra=0.026 μm), a maximum height $R_{max}$ of 0.59 μm ($R_{max}$=0.59 μm), and a thickness of 15 μm.

The positive electrode and the test cell thus prepared are hereinafter referred to as Comparative Positive Electrode x1 and Comparative Cell X1, respectively.

Comparative Example 2

A positive electrode and a test cell were prepared in the same manner in Example except that a positive electrode current collector formed of an aluminum foil subjected to a blasting process for roughening, with surface roughness Ra of 0.28 μm (Ra=0.28 em), the maximum height $R_{max}$ of 4.4 μm ($R_{max}$=4.4 μm), and the thickness of 30 μm, was used.

The positive electrode and the test cell thus prepared are hereinafter referred to as Comparative Positive Electrode x2 and Comparative Cell X2, respectively.

Experiment 1

Using the foregoing Cell A of the invention and Comparative Cells X1 and X2, the discharge capacities per 1 g of the active material (mAh/g) were found at discharge current rates of 0.1 It, 0.2 It, 0.5 It, 1.0 It, and 2.0 It. The results are shown in Table 1. The charge-discharge conditions were as follows.

Charge-Discharge Conditions in the Case of a Discharge Current Rate was 0.1 It
—Charge Condition
The cells were charged at a charge current rate of 0.1 It until the cell voltage reached 4.5 V.
—Discharge Condition
The cells were discharged at a discharge current rate of 0.1 It until the cell voltage reached 2.0 V.

By charging and discharging the cells under the above-noted conditions, the discharge capacities per 1 g of the active material (mAh/g) in 0.1 It discharge were found from the discharge durations at the first cycle.

Charge-Discharge Conditions in the Case of a Discharge Current Rate of 0.2 It
After the foregoing charge-discharge operation with a discharge current rate of 0.1 It was completed, the cells were charged and discharged under the following conditions.
—Charge Condition
The cells were charged at a charge current rate of 0.2 It until the cell voltage reached 4.5 V.
—Discharge Condition
The cells were discharged at a discharge current rate of 0.2 It until the cell voltage reached 2.0 V.

After repeating the charge-discharge operation under the above-noted conditions 6 times, the discharge capacities per 1 g of the active material (mAh/g) in 0.2 It discharge were found from the discharge durations at the 6th cycle.

Charge-Discharge Conditions in the Case of a Discharge Current Rate of 0.5 It
After the foregoing charge-discharge operation with a discharge current rate of 0.2 It was completed, the cells were charged and discharged under the following conditions.
—Charge Condition
The cells were charged at a charge current rate of 0.2 It until the cell voltage reached 4.5 V.
—Discharge Condition
The cells were discharged at the discharge current rate of 0.5 It until the cell voltage reached 2.0 V.

The discharge capacity per 1 g of the active material (mAh/g) was found from the discharge durations at the 7th cycle.

Charge-Discharge Conditions in the Case of a Discharge Current Rate of 1.0 It
After the foregoing charge-discharge operation with a discharge current rate of 0.5 It was completed, the cells were charged and discharged under the following conditions.
—Charge Condition
The cells were charged at a charge current rate of 0.2 It until the cell voltage reached 4.5 V.
—Discharge Condition
The cells were discharged at a discharge current rate of 1.0 It until the cell voltage reached 2.0 V.

The discharge capacities per 1 g of the active material (mAh/g) in 1.0 It discharge current rate were found from the discharge durations at the 8th cycle.

Charge-Discharge Conditions in the Case of a Discharge Current Rate of 2.0 It
After the foregoing charge-discharge operation with a discharge current rate of 1.0 It was completed, the cells were charged and discharged under the following conditions.
—Charge Condition
The cells were charged at a charge current rate of 0.2 It until the cell voltage reached 4.5 V.
—Discharge Condition
The cells were discharged at a discharge current rate of 2.0 It until the cell voltage reached 2.0 V.

The discharge capacities per 1 g of the active material (mAh/g) in 2.0 It discharge were found from the discharge durations at the 9th cycle.

The average discharge voltages of Cell A of the invention, Comparative Cell X1, and Comparative Cell X2 in 2.0 It discharge were found to be 2.8 V, 2.6 V, and 2.8 V respectively.

TABLE 1

| Test cell | Positive electrode current collector | | | | Discharge capacity per 1 g of active material (mAh/g) | | | | |
|---|---|---|---|---|---|---|---|---|---|
| | Blasting | Surface roughness (μm) | Maximum height (μm) | Thickness (μm) | 0.1 It | 0.2 It | 0.5 It | 1.0 It | 2.0 It |
| A | Yes | 0.180 | 2.20 | 19.4 | 147.1 | 136.4 | 131.6 | 124.7 | 94.7 |
| X1 | No | 0.026 | 0.59 | 15.0 | 147.6 | 136.1 | 130.1 | 120.5 | 83.3 |
| X2 | Yes | 0.280 | 4.40 | 30.0 | 147.3 | 136.1 | 131.2 | 124.5 | 94.5 |

The results shown in Table 1 clearly demonstrate that Comparative Cell X1, which was provided with Comparative Positive Electrode x1 using the positive electrode current collector formed of the aluminum foil that was not subjected to a blasting process for roughening, showed a lower discharge capacity per 1 g of the active material as the discharge rate increases. In contrast, it will be appreciated that Cell A of the invention and Comparative Cell X2, which were provided with Positive Electrode a of the invention and Comparative Positive Electrode x2 each employing the positive electrode current collector formed of the aluminum foil that was subjected to a blasting process for roughening, showed that their discharge capacities per 1 g of the active material improved as the discharge rate increased, in comparison with Comparative Cell X1. The reason is believed to be that, in Positive Electrode a of the invention and Comparative Positive Electrode x2, which employed the positive electrode current collector formed of the aluminum foil subjected to a blasting process for roughening, the contact area between the positive electrode active material-containing layer and the aluminum foil, serving as the positive electrode current collector, increased and the contact resistance reduced; therefore, the utilization factor of the active material improved, leading to the increase in the discharge capacity per 1 g of the active material.

Experiment 2

Based on the results of the foregoing Experiment 1, the volumetric capacity densities of Positive Electrode a of the invention and Comparative Positive Electrodes x1 and x2 were calculated according to Equation (3) below. The results are shown in Table 2.

Volumetric capacity density (mAh/ml)=Discharge capacity per 1 g of the positive electrode active material×(Mass of the positive electrode active material/Mass of the positive electrode mixture)× (Filling density of active material)×(Thickness of positive electrode active material-containing layer/Total thickness of positive electrode)    Eq. (3)

Here, for example, in the 1.0 It discharge of Positive Electrode a of the invention, the discharge capacity per 1 g of the positive electrode active material was 124.7 (mAh/g); the mass of the positive electrode active material/the mass of the positive electrode active material-containing layer=90/100; the filling density of the active material was 2.2 g/mL; and the thickness of the positive electrode active material-containing layer/the thickness of the total positive electrode=(60+60)/(60+60+19.4). By substituting these numerical values into Equation (3), the volumetric capacity density of Positive Electrode a of the invention in 1.0 It discharge is found to be 212.5 mAh/mL.

TABLE 2

| Test cell | Positive electrode current collector | | | | Volume energy density | | Average voltage at 2.0 It (V) |
|---|---|---|---|---|---|---|---|
| | Blasting | Surface roughness ($\mu$m) | Maximum height ($\mu$m) | Thickness ($\mu$m) | 1.0 It (mAh/mL) | 2.0 It (mAh/mL) | |
| A | Yes | 0.180 | 2.20 | 19.4 | 212.5 | 179.3 | 2.8 |
| X1 | No | 0.026 | 0.59 | 15.0 | 212.1 | 162.9 | 2.6 |
| X2 | Yes | 0.280 | 4.40 | 30.0 | 197.2 | 166.3 | 2.8 |

As clearly seen from the results shown in Table 2, even with Comparative Cell X2, which is provided with Comparative Positive Electrode x2 employing the positive electrode current collector formed of the aluminum foil subjected to a blasting process for roughening, the volume energy density was lower in 1.0 It discharge than Comparative Cell X1, which is provided with Comparative Positive Electrode x1 employing the positive electrode current collector formed of the aluminum foil that was not subjected to a blasting process for roughening. Cell A of the invention, which is provided with Positive Electrode a of the invention employing the positive electrode current collector formed of the aluminum foil subjected to a blasting process for roughening, at the discharge of 1.0 It and 2.0 It, the volume energy density improved in comparison with Test Cell X1.

In Comparative Positive Electrode x2, since the thickness of the roughened aluminum foil, which was the positive electrode current collector, was relatively thick, 30 $\mu$m, the volume of the positive electrode current collector in the positive electrode was large, reducing the volume energy density of the positive electrode. Thus, it is preferable that the thickness of the roughened aluminum foil, which was the positive electrode current collector, be less than 20 $\mu$m, as Positive Electrode a of the invention. In this case, it is necessary to control the mean surface roughness Ra of the aluminum foil having a thickness of less than 20 $\mu$m; however, in some cases, it may be technically difficult to fabricate an aluminum foil having a mean surface roughness of 0.20 $\mu$m using a blasting technique.

For this reason, when blasting is used to roughen an aluminum foil having a thickness of less than 20 $\mu$m, it is desirable that the mean surface roughness Ra be restricted to be less than 0.20 $\mu$m. Nevertheless, as will be apparent from the results shown in Tables 1 and 2, if the mean surface roughness Ra ($\mu$m) is too small, that is, in the case of 0.026 $\mu$m as with Comparative Positive Electrode x1, it will be impossible to improve the adherence between the positive electrode active material and the conductive agent, the adherence between the conductive agent and the positive electrode current collector, and the adherence between the positive electrode current collector and the positive electrode active material. For these reasons, it is desirable that when roughening an aluminum foil having a thickness of less than 20 $\mu$m by blasting, the mean surface roughness Ra ($\mu$m) be restricted to fall within the range 0.026 $\mu$m<Ra<0.20 $\mu$m.

Thus, the use of the positive electrode current collector wherein the mean surface roughness Ra ($\mu$m) satisfies the relation 0.026 $\mu$m<Ra<0.20 $\mu$m increases the contact area between the positive electrode active material particles and the positive electrode current collector and thereby significantly improves the adherence between the positive electrode active material particles and the positive electrode current collector. Therefore, even when forming the positive electrode active material-containing layer on the positive electrode current collector so that the thickness of the positive electrode active material-containing layer becomes great, the peeling-off of the positive electrode active material-containing layer from the positive electrode current collector can be prevented. As a result, it becomes possible to maintain the condition in which the positive electrode current collector retains the positive electrode active material-containing layer, and therefore, it becomes possible to apply the positive electrode active material in an amount comparable to that for LiCoO$_2$, which has been conventionally used as a positive electrode active material, over an equal area of the positive electrode current collector.

Second Embodiment

Example 1

A cell was fabricated in the same manner as in Example of the First Embodiment, except that a positive electrode was prepared in the following manner.

The cell thus prepared is hereinafter referred to as Cell B1 of the invention.

First, lithium iron phosphate (LiFePO$_4$), which is an active material, was measured to account for 85 mass % with respect to the total positive electrode active material-containing layer, and carbon black (BET specific surface area: 70 m$^2$/g), which is a conductive agent, was measured to account for 10 mass % with respect to the total positive electrode active material-containing layer, and thereafter, both were mixed together. Next, polyacrylonitrile (PAN), which is a binding agent, was mixed at 5 mass % with respect to the total positive electrode active material-containing layer in the mixture, and an appropriate amount of N-methylpyrrolidone (NMP) solution, which is a solvent, was added thereto and mixed, whereby a slurry was prepared. Then, the slurry was coated, by doctor blading, on an aluminum foil that had been subjected to a blasting process for roughening and had a surface roughness Ra of 0.14 μm ($R_a$=0.14 μm), a maximum height $R_{max}$ of 1.6 μm ($R_{max}$=1.6 μm), and a thickness of 15.0 μm.

Thereafter, the electrode that had been coated with the slurry was dried at 80° C. using a hot plate, and then, the dried electrode was passed through the rollers of the P.C. controller (PCF1075NH-AM manufactured by Hitachi, Ltd) while sandwiching the electrode with 0.1-mm thick SUS boards, to carry out the first pressure-rolling. The specific conditions are as following (1).

(1) The Conditions of the First Pressure-Rolling
  Roller slit width: 150 μm
  Roller rotation speed: 200 rpm
  Number of passage through rollers: 4

Thereafter, the pressure-rolled electrode was cut out into a size of 2 cm×2 cm, and then, while the slurry coated article was sandwiched between 0.1 mm-thick plates made of SUS, the pressure-rolled electrode was passed through the rollers with varying the slit width between the rollers by a P.C. controller similar to that described above. This process was conducted two times to further pressure-roll the just-noted pressure-rolled electrode. The specific conditions are as specified in (2) and (3) below.

(2) The Conditions of the Second Pressure-Rolling
  Roller slit width: 120 μm
  Roller rotation speed: 200 rpm
  Number of passage through rollers: 4

(3) The Conditions of the Third Pressure-Rolling
  Roller slit width: 100 μm
  Roller rotation speed: 200 rpm
  Number of passage through rollers: 4

Finally, the electrode was vacuum dried. Thus, a positive electrode was prepared.

Example 2

A test cell was prepared in the same manner as Example 1 above except that the carbon black used as the conductive agent had a BET specific surface area of 39 m²/g.

The cell thus prepared is hereinafter referred to as Cell B2 of the invention.

Example 3

A test cell was prepared in the same manner as Example 1 above except that the carbon black used as the conductive agent had a BET specific surface area of 15 m²/g.

The cell thus prepared is hereinafter referred to as Cell B3 of the invention.

Example 4

A test cell was prepared in the same manner as Example 1 above except that the carbon black used as the conductive agent had a BET specific surface area of 90 m²/g.

The cell thus prepared is hereinafter referred to as Cell B4 of the invention.

Example 5

A test cell was prepared in the same manner as in the foregoing Example 1 above except that the carbon black used as the conductive agent had a BET specific surface area of 300 m²/g.

The cell thus prepared is hereinafter referred to as Cell B5 of the invention.

Example 6

A test cell was prepared in the same manner as in the foregoing Example 1 except that the lithium iron phosphate, which was the active material, was regulated to be 90% of the total mass of the positive electrode active material-containing layer, and the one having a BET specific surface area of 70 m²/g, which was used in the foregoing Example 1, was regulated to be 5% of the total mass of the positive electrode active material-containing layer.

The cell thus prepared is hereinafter referred to as Cell B6 of the invention.

Example 7

A test cell was prepared in the same manner as the foregoing Example 1 except that the carbon black used a conductive agent was a mixture of the one having a BET specific surface area of 70 m²/g, which was used in the foregoing Example 1, and the one having a BET specific surface area of 15 m²/g, which was used in the foregoing Example 3, which were mixed so that each of them account for 5% of the total mass of the positive electrode active material-containing layer.

The cell thus prepared is hereinafter referred to as Cell B7 of the invention.

Comparative Example 1

A test cell was prepared in the same manner as in the foregoing Example 1 except that the carbon black used as the conductive agent had a BET specific surface area of 12 m²/g.

The cell thus prepared is hereinafter referred to as Comparative Cell Y1.

Comparative Example 2

A test cell was prepared in the same manner as in the foregoing Example 1 except that the electrode plate was pressure-rolled only with the first pressure-rolling condition (1) shown in the Best Mode for Carrying Out the Invention, and was not subjected to the second or third pressure-rolling.

The cell thus prepared is hereinafter referred to as Comparative Cell Y2.

Experiment

The filling densities in the positive electrode active material mixture-containing layer of Cells B1 to B7 of the invention and Comparative Cells Y1 and Y2 were measured, and from the obtained values, the filling densities for only the positive electrode active material were calculated. At the same time, charging and discharging were repeatedly performed under the same charge-discharge conditions shown in Experiment 1 of the foregoing first Embodiment to study discharge capacities per 1 g of the positive electrode active material. The results are shown in Table 3.

TABLE 3

| Test cell | | B1 | B2 | B3 | B4 | B5 | B6 | B7 | Y1 | Y2 |
|---|---|---|---|---|---|---|---|---|---|---|
| BET specific surface area of conductive agent (m²/g) | | 70 | 39 | 15 | 90 | 300 | 70 | 70 + 15 | 12 | 70 |
| Amount of conductive agent (mass %) | | 10 | 10 | 10 | 10 | 10 | 5 | 5 + 5 | 10 | 10 |
| Filling density in positive electrode active material-containing layer (g/cm³) | | 2.0 | 2.1 | 2.2 | 2.1 | 2.1 | 2.2 | 2.3 | 2.2 | 1.6 |
| Filling density of positive electrode active material (g/cm³) | | 1.7 | 1.8 | 1.9 | 1.8 | 1.8 | 2.0 | 2.0 | 1.9 | 1.4 |
| Positive electrode current collector | Surface roughness (μm) | 0.14 | 0.14 | 0.14 | 0.14 | 0.14 | 0.14 | 0.14 | 0.14 | 0.14 |
| | Maximum height (μm) | 1.6 | 1.6 | 1.6 | 1.6 | 1.6 | 1.6 | 1.6 | 1.6 | 1.6 |
| | Thickness (μm) | 15.0 | 15.0 | 15.0 | 15.0 | 15.0 | 15.0 | 15.0 | 15.0 | 15.0 |
| Discharge capacity per 1 g of active material (mAh/g) | 0.1 It | 156.4 | 139.5 | 145.5 | 154.7 | 156.9 | 145.5 | 155.6 | 107.6 | 145.8 |
| | 0.2 It | 152.7 | 118.8 | 132.2 | 150.8 | 153.8 | 138.8 | 152.3 | 75.0 | 137.1 |
| | 0.5 It | 147.1 | 105.7 | 118.6 | 144.8 | 149.1 | 130.1 | 146.9 | 50.1 | 32.4 |
| | 1.0 It | 138.8 | 96.4 | 109.7 | 138.7 | 143.7 | 123.8 | 141.5 | 36.9 | Unmeasurable |
| | 2.0 It | 115.5 | 77.8 | 97.8 | 129.3 | 127.5 | 103.0 | 132.3 | 13.7 | Unmeasurable |

As clearly seen from Table 3, in Cells B1 to B7 of the invention, which used the conductive agent having a BET specific surface area of 15 m²/g or greater and the positive electrode active material-containing layer had a filling density of 1.7 g/cm³ or greater, a large discharge capacity was attained not only in discharging with low rates (discharge current 0.1 It to 0.5 It) but also in discharging at high rates (discharge current 1 It to 2 It). In contrast, in Comparative Cell Y1, which had a small BET specific surface area (BET specific surface area: 12 m²/g), only a small discharge capacity was attained both in discharging at low rates and in discharging at high rates, although its positive electrode active material-including layer had a large filling density (filling density: 2.2 g/cm³). It was also recognized that in Comparative Cell Y2, which had a small filling density in the positive electrode active material-containing layer (filling density: 1.6 g/cm³), although a certain amount of discharge capacity was obtained in weak low-rate discharging (discharge current 0.1 It to 0.2 It) because the BET specific surface area was large (BET specific surface area: 70 m²/g), the discharge capacity became very small in slightly higher low-rate discharging (discharge current 0.5 It) and discharging was impossible in high-rate discharging.

It is believed that the results are attributed to the following reasons. In Comparative Cell Y1, which uses a conductive agent having a small BET specific surface area, the contact area between lithium iron phosphate, used as the positive electrode active material, and the conductive agent is small. In Comparative Cell Y2, in which the positive electrode active material-containing layer has a small filling density, the adherence between the positive electrode active material and the conductive agent and the adherence between the active material and the active electrode collector become poor. These suggest that when the conductive agent has a small BET specific surface area or when in the positive electrode active material-containing layer has a small filling density, the electronic conductivity within the positive electrode becomes insufficient. In contrast, Cells B1 to B7 of the invention, in which the conductive agent had a BET specific surface area of 15 m²/g or greater and the positive electrode active material-containing layer had a filling density of 1.7 g/cm³ or greater, the contact area between the positive electrode active material and the conductive agent becomes large because the particle size of the conductive agent is small, making it possible to disperse a sufficient amount of conductive agent over the surface of the lithium iron phosphate, which is the positive electrode active material; moreover, the adherence between the conductive agent and the lithium iron phosphate, which is the positive electrode active material, and the adherence between the positive electrode active material and the positive electrode current collector is enhanced because the positive electrode active material-containing layer has a large filling density. For these reasons, it is believed that in Cells B1 to B7 of the invention, good conductive paths are formed within the positive electrode, significantly improving the electronic conductivity within the positive electrode.

Third Embodiment

Example 1

The foregoing Cell B6 shown in Example 6 of the second embodiment was used as Example 1.

Example 2

A test cell was prepared in the same manner as in the foregoing Example 1 that a positive electrode current collector that was not subjected to a roughening process [the surface roughness Ra was 0.026 μm (Ra=0.026 μm)] was used as the positive electrode current collector.

The cell thus prepared is hereinafter referred to as Cell C of the invention.

Experiment

The filling densities in the positive electrode active material mixture-containing layers of Cells B6 and C of the invention were measured, and from the obtained values, the filling densities for only the positive electrode active material were calculated. At the same time, charging and discharging were repeatedly performed under the same charge-discharge conditions shown in Experiment 1 of the foregoing first embodiment to determine discharge capacities per 1 g of the positive electrode active material. The results are shown in Table 4.

TABLE 4

| Test cell | | B6 | C |
|---|---|---|---|
| Positive electrode current collector | Roughening | Yes | No |
| | Surface roughness (μm) | 0.14 | 0.026 |

TABLE 4-continued

| Test cell | | B6 | C |
|---|---|---|---|
| Maximum height (μm) | | 1.6 | 0.59 |
| Thickness (μm) | | 15.0 | 15.0 |
| BET specific surface area of conductive agent (m$^2$/g) | | 70 | 70 |
| Amount of conductive agent (mass %) | | 5 | 5 |
| Filling density in positive electrode active material-containing layer (g/cm$^3$) | | 2.2 | 2.2 |
| Filling density of positive electrode active material (g/cm$^3$) | | 2.0 | 2.0 |
| Discharge capacity per 1 g of active material (mAh/g) | 0.1 It | 145.5 | 147.6 |
| | 0.2 It | 138.8 | 136.1 |
| | 0.5 It | 130.1 | 130.1 |
| | 1.0 It | 123.8 | 120.5 |
| | 2.0 It | 103.0 | 83.3 |

The foregoing Table 4 clearly demonstrates that while the two cells showed no discernible difference in discharge capacity at low rates, Cell B6 of the invention showed greater discharge capacities at high rates than Cell C of the invention.

It is believed that the results are attributed to the following reason. That is, Cell B6 of the invention, which uses the roughened aluminum foil as the positive electrode current collector, has irregularities on the surface of the positive electrode current collector, which increase the contact areas between the positive electrode current collector and the conductive agent and between positive electrode current collector and the positive electrode active material, further enhancing the adherence therebetween. In contrast, it is believed that Cell C of the invention, which uses as the positive electrode current collector an aluminum foil that has not been roughened, has no irregularities on the surface of the positive electrode current collector, and therefore, the contact areas between the positive electrode current collector and the conductive agent, and between the positive electrode current collector and the positive electrode active material become slightly small, somewhat lowering the adherence therebetween.

Other Variations (1) Only lithium iron phosphate was used as the positive electrode active material in the foregoing embodiments 1 to 3. However, a positive electrode active material containing olivine-type lithium phosphate, such as lithium iron phosphate, can be effective in the invention.

(2) Although blasting was used as the roughening process for the positive electrode current collector in the foregoing embodiments 1 to 3, various other techniques may be employed, such as polishing by sandpaper, etching techniques by physical etching or chemical etching, dry-process plating such as vacuum deposition, sputtering, and CVD, wet-process plating such as electroplating and electroless plating. These methods are detailed below.

—Etching

For example, after coating a resist on the positive electrode current collector, an unnecessary portion of the resist is removed and the portion from which the resist has been removed is etched, whereby irregularities are formed on a surface of the positive electrode current collector.

—Dry-Process Plating

While masking a portion of the positive electrode current collector, for example, by forming a holder for holding the positive electrode current collector into a mesh shape, a portion of a surface of the positive electrode current collector is plated, whereby irregularities are formed on the surface of the positive electrode current collector.

—Wet-Process Plating

A resist is coated on a portion of the positive electrode current collector in a similar manner to that in the etching, or a masking tape or the like is adhered on the positive electrode current collector, and thereafter, a portion of a surface of the positive electrode current collector is plated, whereby irregularities are formed on the surface of the positive electrode current collector.

(3) Although aluminum is used for the positive electrode current collector in the foregoing embodiments 1 to 3, this is not meant to be restrictive. However, the use of aluminum is preferable in that aluminum has the advantage that the oxidation potential is high, so the current collector does not oxidized and dissolved even during charging of the positive electrode.

(4) Although the pressure-rolling of the electrode plates was carried out three times in the foregoing Embodiments 2 and 3, the number thereof is not particularly limited; of course, it may be carried out either one time or two times, or four times or more.

(5) The non-aqueous electrolyte is not limited to ethylene carbonate or diethyl carbonate, but other electrolytes may be used, such as cyclic carbonic esters, chain carbonic esters, esters, cyclic ethers, chain ethers, nitriles, and amides.

In addition to the ethylene carbonate, examples of the cyclic carbonic esters include propylene carbonate and butylenes carbonate, and it is possible to use a substance in which part of or all of their hydro groups is/are fluorinated, such as trifluoropropylene carbonate and fluoroethyl carbonate.

In addition to the above-mentioned ethyl carbonate, examples of the chain carbonic esters include, dimethyl carbonate, ethyl methyl carbonate, methyl propyl carbonate, ethyl propyl carbonate, and methyl isopropyl carbonate, and it is possible to use part of or whole of the hydrogen. Examples of the esters include methyl acetate, ethyl acetate, propyl acetate, methyl propionate, ethyl propionate, and γ-butyrolactone.

Examples of the cyclic ethers include: 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the chain ethers include: 1,2-dimethoxyethane, diethyl ether, dipropyl ether, diisopropyl ether, dibutyl ether, dihexyl ether, ethyl vinyl ether, butyl vinyl ether, methylphenyl ether, ethyphenyl ether, butylphenyl ether, pentylphenyl ether, methoxytoluene, benzyl ethyl ether, diphenyl ether, debenzyl ether, O-dimethoxybenzene, 1,2-diethoxy ethane, 1,2-dobutoxy ethane, diethylene glycol dibutyl ether, 1,1-dimethoxy methane, 1,1-diethoxy ethane, triethylene glycol dimethyl ether, and tetraethylene glycol dimethyl.

Examples of the nitriles include acetonitrile. Examples of the amides include dimethylformamide. In particular, from the viewpoint of stability in voltage, it is preferable to use cyclic carbonic esters such as ethylene carbonate and propylene carbonate, or chain carbonic esters such as dimethyl carbonate, diethyl carbonate, and dipropyl carbonate.

The electrolyte is not limited to $LiPF_6$, and various other substances may be used, including $LiAsF_6$, $LiBF_4$, $LiCF_3SO_3$, $LiN(ClF_{2l+1}SO_2)(C_mF_{2m+1}SO_2)$ (wherein l and m are integers equal to or greater than 1), $LiC(C_pF_{2p+1}SO_2)(C_qF_{2q+1}SO_2)(C_rF_{2r+1}SO_2)$ (wherein p, q, and r are integers equal to or greater than 1). In addition, lithium difluoro(oxalate)borate as represented by the following chemical formula (1) may be used. These electrolytes may be used either alone or in combination of two or more of them. These electrolytes are preferably used by dissolving them in the above-described non-aqueous solvent so that the concentration becomes 0.1 M to 1.5 M, and more preferably, 0.5 M to 1.5 M.

[Chemical Formula 1]

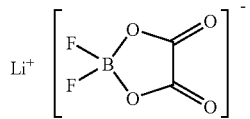

INDUSTRIAL APPLICABILITY

The present invention is also applicable to large-sized batteries for, for example, in-vehicle power sources for electric automobiles or hybrid automobiles, as well as the device power sources for mobile information terminals such as mobile telephones, notebook computers, and PDAs.

What is claimed is:

1. A non-aqueous electrolyte battery comprising:
   a positive electrode comprising a positive electrode current collector and a positive electrode active material-containing layer formed on the positive electrode current collector,
   a negative electrode, and
   a non-aqueous electrolyte,
   wherein the positive electrode active material-containing layer comprises:
      particles of an olivine-type lithium phosphate as a positive electrode active material, and
      first carbon particles having BET specific surface area of 70 m²/g or greater;
   wherein the positive electrode current collector has a thickness of less than 20 μm, and a surface of the positive electrode current collector that is in contact with the positive electrode active material-containing layer has a mean surface roughness Ra of greater than 0.026 μm and smaller than 0.14 μm; and
   wherein the positive electrode active material-containing layer has a filling density of 1.7 g/cm³ or greater.

2. The non-aqueous electrolyte battery according to claim 1, wherein the olivine-type lithium phosphate is lithium iron phosphate.

3. The non-aqueous electrolyte battery according to claim 2, wherein the positive electrode current collector is an aluminum foil subjected to a roughened process.

4. The non-aqueous electrolyte battery according to claim 3, wherein the roughening process is carried out by polishing by blasting.

5. The non-aqueous electrolyte battery according to claim 2, wherein the lithium iron phosphate particles have an average particle size of 10 μm or less.

6. The non-aqueous electrolyte battery according to claim 2, wherein the positive electrode active material-containing layer has a filling density of 3.15 g/cm³ or less.

7. The non-aqueous electrolyte battery according to claim 1, wherein the positive electrode current collector is an aluminum foil subjected to a roughened process.

8. The non-aqueous electrolyte battery according to claim 7, wherein the roughening process is carried out by polishing by blasting.

9. The non-aqueous electrolyte battery according to claim 1, wherein the positive electrode active material-containing layer has a filling density of 3.15 g/cm³ or less.

10. The non-aqueous electrolyte battery according to claim 1, wherein second carbon particles are superficially coated on, or adhered to, the particles of olivine-type lithium phosphate.

11. The non-aqueous electrolyte battery according to claim 1, wherein a portion of lithium sites in the positive electrode active material is substituted by a transition metal.

12. The non-aqueous electrolyte battery according to claim 1, wherein the first carbon particles have BET specific surface area of 70 m²/g to 90 m²/g.

* * * * *